Sept. 17, 1968 W. T. SAURENMANN 3,401,831
DENESTER
Filed May 11, 1966 4 Sheets-Sheet 1

INVENTOR
W. T. SAURENMANN, DECEASED,
BY MARGARET P. SAURENMANN, ADMINISTRATRIX

BY Young & Quigg
ATTORNEYS

INVENTOR
W. T. SAURENMANN, DECEASED,
BY MARGARET P. SAURENMANN,
ADMINISTRATRIX

BY Young & Quigg
ATTORNEYS

United States Patent Office 3,401,831
Patented Sept. 17, 1968

3,401,831
DENESTER
William T. Saurenmann, deceased, late of Whittier, Calif., by Margaret P. Saurenmann, executrix, Whittier, Calif., assignor to Phillips Petroleum Company, a corporation of Delaware
Filed May 11, 1966, Ser. No. 549,374
9 Claims. (Cl. 221—36)

ABSTRACT OF THE DISCLOSURE

A stack of open end up, flexible, thermoformed, thermoplastic, dish-like containers having an outwardly extending flange around the top of each container is denested by the application of a vacuum to the flange of the lowermost container to peel the flange away from the flange of the next container, air is blown between the peeled away flange and the adjacent flange to break the vacuum between the two containers, and the application of a vacuum cup to the bottom of the lowermost container to pull the lowermost container from the stack. Air jets can be used to push the detached container along a chute and into a pocket of a conveyor.

---

Figure 1:
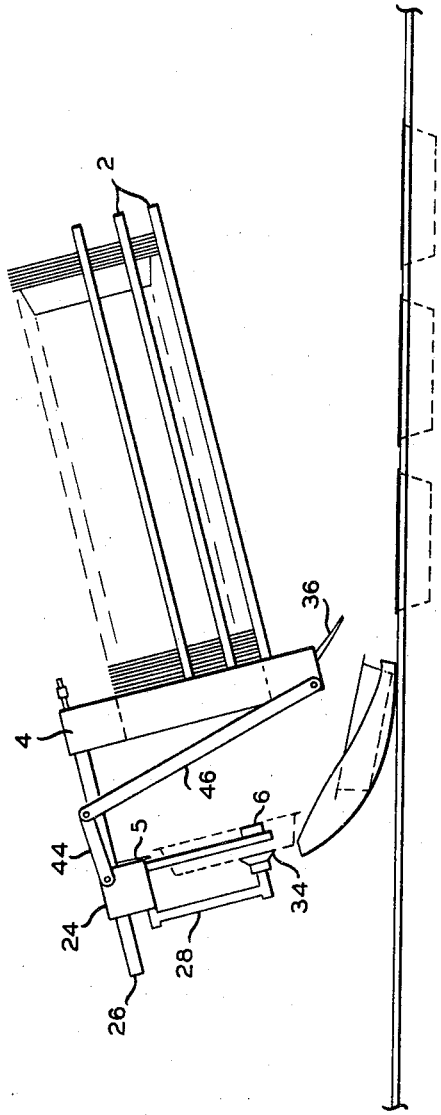

This invention relates to a denester for formed containers. In one of its aspects, it relates to a method and means for denesting formed containers having outwardly extending flanges whereby the containers are serially removed from a stack of containers by peeling back the flange of the lowermost container in the stack, blowing air between the lowermost container and the second container in the stack to break the vacuum, and pulling the lowermost container from the stack. In another of its aspects, the invention relates to a method and means for denesting containers as described hereinbefore wherein the containers are delivered to a chute which feeds the same to a pocket conveyor and air is blown against the containers to urge them to settle in the pockets. In a still further aspect, the invention relates to a method and means for denesting a stack of flanged containers as hereinbefore described wherein a vacuum means is used to peel back the flange of the lowermost container and a vacuum means is used to pull the lowermost container from the stack. In a still further aspect, the invention relates to a method and means for denesting a stack of flanged containers wherein the stack is held at an acute angle to the horizontal. In a still further aspect, the invention relates to a method and means for denesting a stack of flanged containers wherein the suction means which pulls the containers from the stack reciprocates toward and away from the stack and by so doing operates a valve which releases the suction when the suction means is away from the stack. In a still further aspect, the invention relates to a method and means for denesting a stack of flanged containers as hereinbefore described wherein a cam operated valve operates a means for blowing air between the two lowermost containers in the stack. In a still further aspect, the invention relates to a method and means for denesting a stack of flanged containers as hereinbefore described wherein a second cam means regulates the reciprocation of the vacuum means which pulls the container from the stack, the second cam means being actuated by a power transfer means which also actuates the first cam means.

The problem of removing containers serially from a stack of such containers is an old problem in the art. Many methods and machines have been devised for the solution of this problem. It is common in the art, for example, to attach a suction cup to the bottom container in a stack to attempt to pull it from the stack and drop it into a chute or onto a conveyor. However, in pulling the bottom container from the stack, there is a problem in removing only one container at a time. This is especially so in flexible containers because the air pressure does not readily flow into the area between the last two containers in the stack.

One prior art apparatus uses a blowing nozzle which extends down along the stack of containers, pushes in slightly on the second from the last container of the stack, thereby opening a channel between the last two containers in the stack and blowing air into the channel, dislodging the bottom container from the stack. However, as may be surmised, this type of apparatus is not applicable to flanged containers.

Dish-like flanged containers have become increasingly popular in the packaging of foods and other materials. Generally, the containers are fed onto a conveyor whereby they are filled, a thermoplastic sheet is placed over the top of the container and sealed in place.

With the perfection of the automation of the packaging operation, it has become increasingly necessary to provide a high speed apparatus for removing containers from a stack of containers and feeding them serially onto the conveyor system. It was discovered that a high speed feeding operation for flanged containers can be achieved with the use of a denesting machine which has a means to peel back the flange on the lowermost container, a means to blow air between the lowermost container and the second container in the stack, and a means for pulling the bottom container from the stack.

It is an object of this invention to provide a method and apparatus for denesting a stack of articles.

It is a further object of this invention to provide a method and apparatus for denesting containers which have an outwardly extending rim or flange at the top portion thereof.

Other aspects, objects and the several advantages of this invention are apparent to one skilled in the art from a study of this disclosure, the drawing and the appended claims.

According to the invention, there is provided a denesting means and method in which the containers are rapidly removed from a stack of such containers by forming an area between the last two containers in the stack for the introduction of air, inducing air into that area and pulling the container from the stack. In one embodiment, a flanged container is removed from a stack of containers by using a suction means to peel back the flange, blowing air into the area between the last two containers in the stack from which the flange has been pulled back, attaching a suction means to the bottom of the container, and pulling the container from the stack.

In another embodiment, the container is released from the suction means after it has been pulled from the stack and is urged by air jets and gravity toward a chute which delivers the container onto a pocketed conveyor, and air is also blown against the containers to gently urge them into the conveyor pockets.

Figure 2:
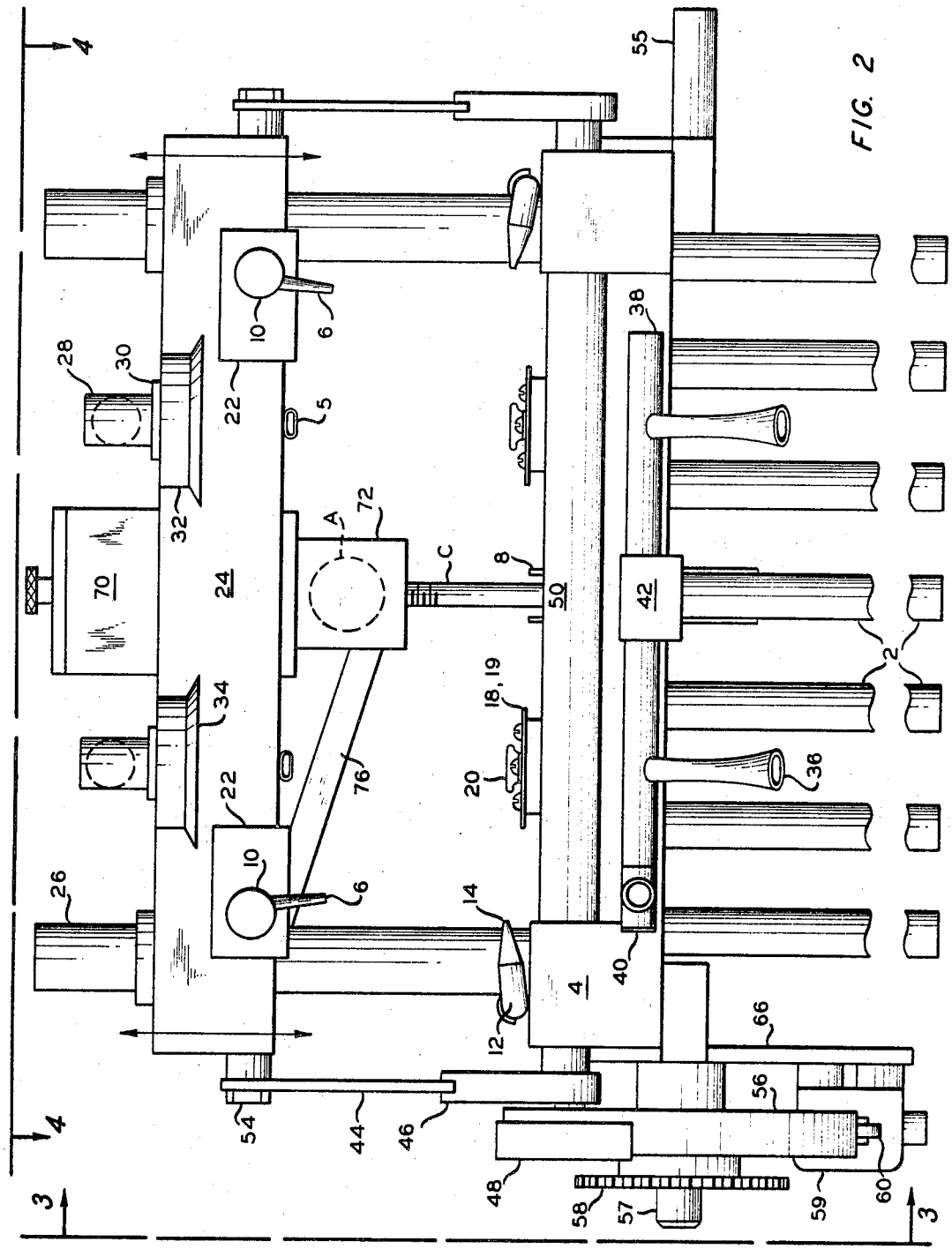
Figure 3:
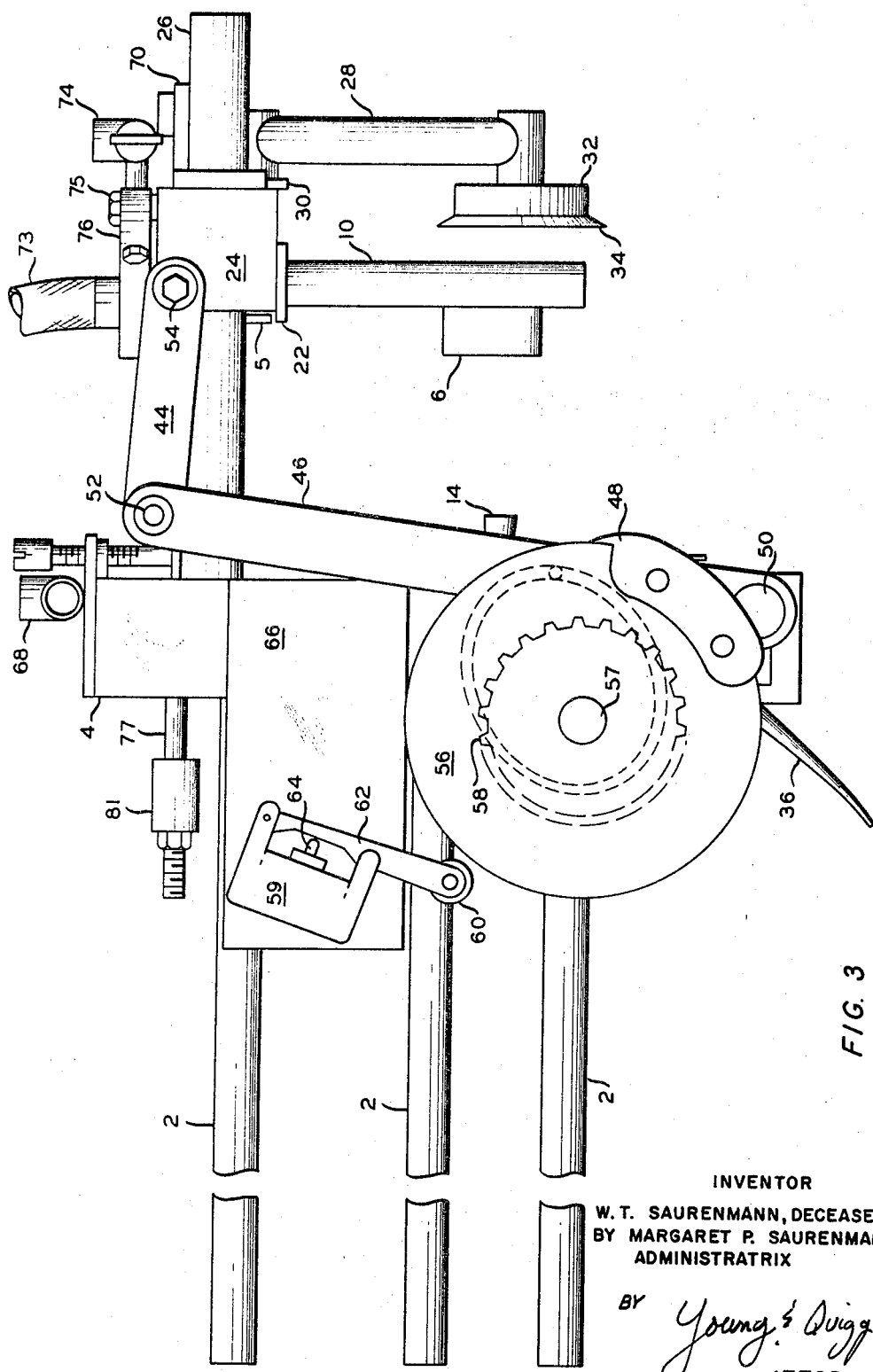
Figure 4:
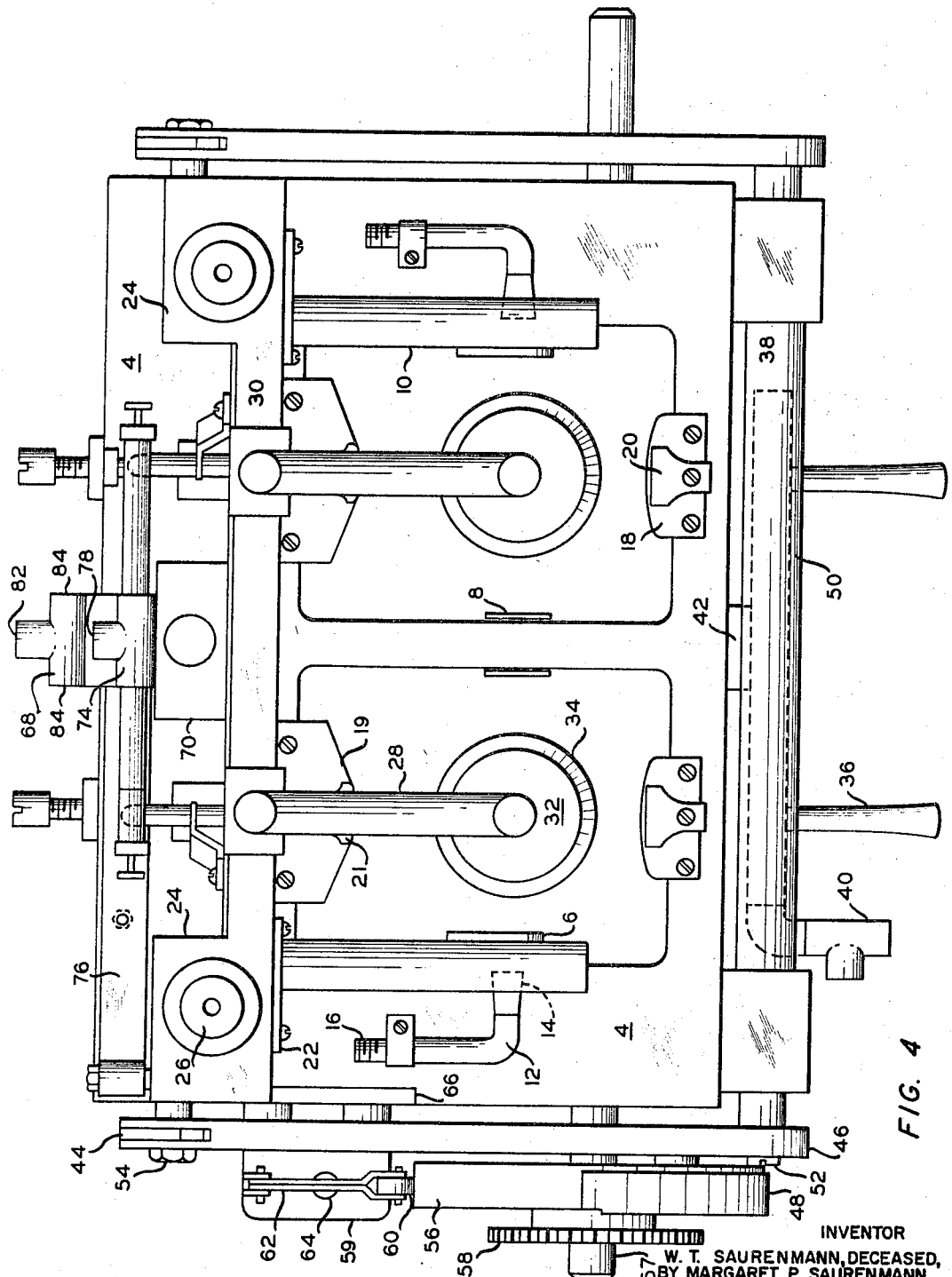

The invention will now be described with reference to the drawings in which FIGURE 1 is an elevation of an apparatus according to the invention; FIGURE 2 is a bottom view of the apparatus shown in FIGURE 1; FIGURE 3 is a side view along lines 3—3 of FIGURE 2; FIGURE 4 is an end view along lines 4—4 of FIGURE 2.

Referring now to the drawings, a plurality of rods 2 serve as stack holders for a plurality of flanged containers. The containers are held at the bottom of the stack by a base 4 having container guides 8, upper finger holders 18 and 19 and lower finger holders 20 and 21. The finger holders 18 and 19 support the container stack while finger holders 20 and 21 aid in the removal of the bottom container from the stack. As can be seen from FIGURE 2, finger holders 18 and 19 are positioned slightly below base 4, while finger holders 20 and 21 are positioned below finger holders 18 and 19. A pair of elongated tubes 6, attached to vacuum tube 10, are supported on vacuum slide holder 24 by plate 22, which is suitably bolted thereto. The elongated tubes 6 contact the flange of the lowermost container in the stack to peel it away from the flange of the second container in the stack. A pair of nozzles 14 attached to blow pipe 12 supply a flow of air to the area in which the container flange has been peeled back by elongated tubes 6. Air pressure is supplied to blow pipes 12 through hose connection 16, a hose (not shown) and valve 59. Blow pipe 12 is also supported by base 4. Base 4 is rigidly attached to support rods 26. The vacuum slide holder 24 is slidably attached to support rods 26 and is attached to reciprocate toward and away from base 4 along the axes of support rods 26. The vacuum slide holder 24 will reciprocate as close to base 4 as is necessary for elongated tubes 6 to contact the flange of the lowermost container of the stack and to allow suction cups 34 to contact the bottom of the bottom container in the stack. Preferably, the vacuum slide holder 24 will reciprocate far enough away from base 4 to allow the container to drop freely onto a conveyor or into a chute which will deposit the container on the conveyor.

Vacuum cups 34 are supported by cup holders 32 which in turn are supported by vacuum rod 28 which is attached to vacuum slide holder 24. The vacuum rod 28 is attached to vacuum slide holder 24 by plate 30.

As the containers are released from vacuum cups 34, they are urged toward and slide down the chute shown in FIGURE 1 and are gently urged into conveyor pockets by means of air which is blown through exhaust air pipe 36 attached to air pipe 38 which supplies air through T 40. Air pipe 38 is attached to base 4 by means of bracket 42. Air is also supplied by jets 5 by T 40. Air from jets 5 urge the containers from vacuum cups 34 toward the chute shown in FIGURE 1.

The reciprocation of vacuum slide holder 24 is actuated by a cam 56 which rotates and contacts and actuates linkage 46 pivoted at 50 on base 4. Linkage 46 actuates linkage 44 connected to 46 at 52, which in turn actuates the reciprocation of vacuum slide holder 24, linkage 44 being attached to vacuum slide holder 24 at 54. Cam 56 has on the inner surface thereof a groove in which fits a cam follower which is attached to linkage 46.

All of the power to the operation can be supplied to gear member 58 which is connected to cam 56 which is rotatably supported on rod 57. The entire apparatus is supported on rod 57 and rod 55. Plate 48 attached to cam 56 actuates valve 59 by striking cam follower 60, attached to linkage 62 which in turn actuates rod 64, as cam 56 rotates. Valve 59 regulates the supply of air to nozzles 14. In other words, when plate 48 is contacting cam follower 60, valve 59 will allow to pass through it to nozzles 14 air pressure to be blown in between the bottom two containers in the stack. Valve 59 is attached to base 4 by plate 66.

Vacuum is drawn in vacuum cups 34 and elongated tubes 6 by a vacuum hose 73 which is attached to valve slide 72 which is slidably mounted in valve block 70 and draws the vacuum therethrough. Valve block 70 is attached to vacuum slide holder 24. Valve slide 72 is slidably engaged with valve block 70 and controls the vacuum supply as the vacuum slide holder 24 reciprocates toward and away from a stack of containers.

In operation, as vacuum slide holder 24 moves toward base 4, slide valve actuating lever 76 contacts base 4 and valve slide 72, and, pivoting about pin 75, forces valve slide 72 into valve block 70 which brings into alignment the vacuum source with conduits in slide holder 24. Suction is then drawn through elongated tube 6 and vacuum cups 34. As vacuum slide holder 24 moves away from base 4, valve slide 72 is pulled from valve block 70 by rod 77 which is attached to valve slide 72 at one end and slidably engages base 4 at the other end, being limited in movement by adjustable member 81 which is threadably secured to rod 77. Upon pulling valve slide 72 from valve block 70, the vacuum source is closed off to vacuum slide holder 24. The vacuum in slide holder 24 is vented to the atmosphere through a vent port in the rear of valve slide 72, thus allowing the pressure to equalize between tube 6 and suction cups 34 and the atmosphere, whereupon the containers are released. Air jets 5 plus the action of gravity urge the containers toward the chute.

Air is supplied through valve 59 to T 68, through opening 82, and out of openings 84 to fitting 16.

In operation, stacks of flanged containers are placed into stack holders 2 right side up, i.e., with the opening of the containers facing out of stack holders 2. It is within the scope of the invention to provide means for maintaining the containers forced against finger holders 18. Gravity normally accomplishes this however. When the stacks of containers are in place, vacuum slide holder 24 moves up to base 4 so that elongated tubes 6, having elongated openings therein, contact the outer flanges of the bottom containers in the stacks. Vacuum is then applied and vacuum tubes 6 attach to the flange of the bottom container in the stack. At the same time, vacuum cups 34 attach to the bottom container in the stack, thereby gripping the same. As the vacuum slide holder 24 begins to move downwardly, slowly at first, elongated tubes 6 pull the flange of the bottom container away from the second container in the stack. At this time, by actuation of valve 59, air will be blown through nozzles 14 into that space left by the peeling back of the flange by elongated tubes 6. Preferably, vacuum cups 34 will be made of a flexible material and will be able to move downwardly slightly without pulling the bottom containers from the stack. The bottoms of the containers will normally flex sufficiently to allow this downward movement without separating the containers. This will allow elongated tubes 6 to peel back the flange of the bottom container in the stack. The blowing of air in between the bottom containers in the stack serves to break the vacuum and in some instances creates a positive pressure between those two containers, thus aiding in their rapid separation. The vacuum slide holder 24 will continue to move away from the stack of containers, now at an increased rate, thereby pulling the bottom container in each stack away from their respective stacks. When the containers have been pulled a sufficient distance away from the stack, the vacuum will be released, by the actuation of valve slide 72 in valve block 70, in both tubes 6 and vacuum cups 34 and the container will be allowed to drop, for example into a chute as shown in FIGURE 1. Jets 5 blowing air against the container side wall aids in moving the container toward the chute. The chute will deliver the containers preferably onto a moving pocketed conveyor. The containers will be urged into place on the conveyor by a supply of air blown through air pipes 36.

By the use of the invention, it has been found that a continuous supply of containers can be serially fed to a filling operation in a rapid manner. Further, the incidence of pulling more than one container from the stack at a time is remarkably low. Control is maintained on the container until it is seated properly in the conveyor pockets.

EXAMPLE I

Four stacks of 4.25 inches wide by 5.25 inches long by 1.5 inches deep tapered flanged polyethylene containers were placed in two of the machines described in the specification and illustrated in the drawings. The machines were to feed these thermoformed containers to two side-by-side pockets in a double line conveyor which carried them to a filling station, a cover applying station, a cover sealing and a cover cooling station, then to a package orienting station and crating station.

The conveyor drive mechanism also was used to chain drive these two denesting machines so the two units would be co-ordinated with the conveyor. The machine was run at a rate such that 300 filled, sealed and crated packages were produced each minue. Each denester ran at 75 cycles per minute depositing two containers each during each cycle. Over a period of one day's operation covering about 8 hours of continuous operation each denester performed perfectly depositing one container in each of the two side-by-side pockets on each cycle and never depositing more than one container in a pocket.

EXAMPLE II

In another test, one denester was operated independently of the conveying and sealing machinery to determine if higher cycle rates were possible. The denester was run at 120 cycles per minute over a period of 8 hours with no malfunctions.

The blowing of air against the containers to settle them in the conveyor pockets allows the operation to progress at a faster rate. The air pressure pushes against the containers so that the containers, which would ordinarily not settle in the pockets due to the speed and movement of the conveyor system, will be forced into the pockets of the moving conveyors.

Whereas the invention has been described with reference to a particular embodiment, it is obvious that the invention can have other embodiments. For example, means for peeling back the container flange other than elongated tubes 6 can be provided; such as, a plurality of small suction cups, one small suction cup or even a non-suction means to peel back the flange. Also, the means to pull the containers from the stack can take forms other than vacuum cups 34. For example, the container pulling means could be embodied in the peeling means and operate only on the flanges or it could attach to the side walls of the containers as shown in Gass et al., U.S. 3,268,116. Further, the container pulling means need not be a vacuum. It could be a device which by friction pulls the containers from the stack. However, the preferred embodiment of the invention is shown in the drawings.

Whereas the invention has been described with the use of air, it is obvious that inert gases or other gases can be used in place of air. For example, carbon dioxide, nitrogen, and other inerts can be used in the operation of the invention.

Reasonable variation and modification are possible within the scope of the foregoing disclosure, the drawings and the appended claims to the invention, the essence of which is that there has been provided a method and means for denesting a stack of flanged containers whereby the flange of the bottom container is peeled away from the flange of a second container in the stack, air is blown in between the bottom two containers in the stack and the container, by vacuum means, is pulled from the stack, and that the containers once separated from the stack and raised into the vacuum means are urged into the conveyor pockets by a stream of air.

What is claimed is:

1. An apparatus for denesting a stack of open end up, flexible, thermoformed containers of a thermoplastic material, each of said containers being a dish-like container having an outwardly extending flange at the top portion thereof, comprising first vacuum means for securement to the lower surface of the flange of the lowermost container in said stack for peeling said flange of said lowermost container away from the flange of the next container in said stack, means for blowing air into the area between the thus peeled away flange and said flange of said next container to break the vacuum between said lowermost container and said next container, and second vacuum means for securement to the lower surface of the bottom portion of said lowermost container for pulling said lowermost container from said stack.

2. Apparatus in accordance with claim 1 wherein said first vacuum means is a vacuum tube with an elongated opening for extended contact along the length of the flange of said lowermost container in said stack.

3. Apparatus in accordance with claim 1 further comprising a chute means for transferring the thus removed container from said second vacuum means to a pocketed conveyor means, and second air blowing means to direct air against said thus transferred container into a pocket in said conveyor means.

4. Apparatus in accordance with claim 1 wherein said air blowing means is actuated by a cam which also actuates said first and second vacuum means.

5. Apparatus in accordance with claim 1 wherein said second vacuum means comprises a vacuum cup which attaches to the bottom surface of the bottom portion of said lowermost container, said first and second vacuum means being integrally connected.

6. Apparatus in accordance with claim 5 wherein said second vacuum means further comprises means for reciprocating said vacuum cup toward and away from said stack, and wherein there is provided a valving means which releases the vacuum on said first and second vacuum means when said first and second vacuum means have moved away from said stack of containers.

7. Apparatus in accordance with claim 6 wherein said stack of containers is held at an acute angle to the horizontal and said vacuum cup is reciprocated at said angle toward and away from said stack.

8. A method of denesting an open end up stack of flexible, thermoformed, thermoplastic dish-like containers having an outwardly extending flange around the open end of each container, whereby the lowermost container is serially removed from said stack, which comprises, applying a vacuum to the lower surface of the flange of the lowermost container in said stack to peel said flange of the lowermost container away from the flange of the next container in said stack, supplying air into the area between the thus peeled away flange and said flange of said next container to break the vacuum between said lowermost container and said next container, applying a vacuum to the lower surface of the bottom portion of said lowermost container to pull said lowermost container from said stack, and releasing the thus removed container.

9. A method in accordance with claim 8 further comprising directing air against said released container to convey said released container to a pocketed conveyor, and directing air against the thus conveyed container to aid in settling said thus conveyed container into a pocket of said conveyor.

References Cited

UNITED STATES PATENTS 2,074,815  3/1937  Tevander.
2,937,786  5/1960  Muller _____ 221—211

FOREIGN PATENTS 1,001,890  8/1965  Great Britain.

ROBERT G. SHERIDAN, *Primary Examiner.*

G. F. ABRAHAM, *Assistant Examiner.*